US012671682B1

(12) United States Patent
Wildes et al.

(10) Patent No.: US 12,671,682 B1
(45) Date of Patent: Jun. 30, 2026

(54) SELF-SERVICE MANAGEMENT OF CUSTOMER-OWNED AUTONOMOUS SYSTEM NUMBERS IN A CLOUD PROVIDER NETWORK

(71) Applicant: Amazon Technologies, Inc., Seattle, WA (US)

(72) Inventors: Lee Alan Wildes, Sterling, VA (US); Peter Daniel Vieira, Herndon, VA (US); Eric Andrew Rubin-Smith, Fairfax, VA (US); Jonathan Phillibert, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 111 days.

(21) Appl. No.: 18/240,754

(22) Filed: Aug. 31, 2023

(51) Int. Cl.
*H04L 9/40* (2022.01)

(52) U.S. Cl.
CPC ........ *H04L 63/0823* (2013.01); *H04L 63/102* (2013.01)

(58) Field of Classification Search
CPC .......................... H04L 63/0823; H04L 63/102
See application file for complete search history.

(56) References Cited

U.S. PATENT DOCUMENTS

| | | | |
|---|---|---|---|
| 9,935,816 B1 * | 4/2018 | Chen | H04L 41/0816 |
| 11,520,615 B1 * | 12/2022 | Iqbal | H04L 61/2571 |
| 2002/0038420 A1 * | 3/2002 | Collins | H04L 9/3249 |
| | | | 713/156 |
| 2019/0238456 A1 * | 8/2019 | Wang | H04L 9/0891 |
| 2023/0216863 A1 * | 7/2023 | Visen | H04L 9/3263 |
| | | | 726/4 |

* cited by examiner

*Primary Examiner* — Viet D Vu
(74) *Attorney, Agent, or Firm* — Perilla Knox & Hildebrandt LLP; Thomas B. Hildebrandt

(57) ABSTRACT

Disclosed are various embodiments for self-service management of customer owned or controlled autonomous system numbers in a cloud provider network. In one embodiment, a request is received from a customer to utilize a first autonomous system number (ASN) of the customer in a cloud provider network. Control of the customer over the first ASN is authenticated based at least in part on data publicly associated with the first ASN. An account with the cloud provider network is authorized to utilize the first ASN based at least in part on an authorization request from the customer. Network traffic is routed according to routing information that associates a network address block of the account in the cloud provider network with the first ASN of the customer instead of a second ASN of the cloud provider network.

20 Claims, 6 Drawing Sheets

100a

100b

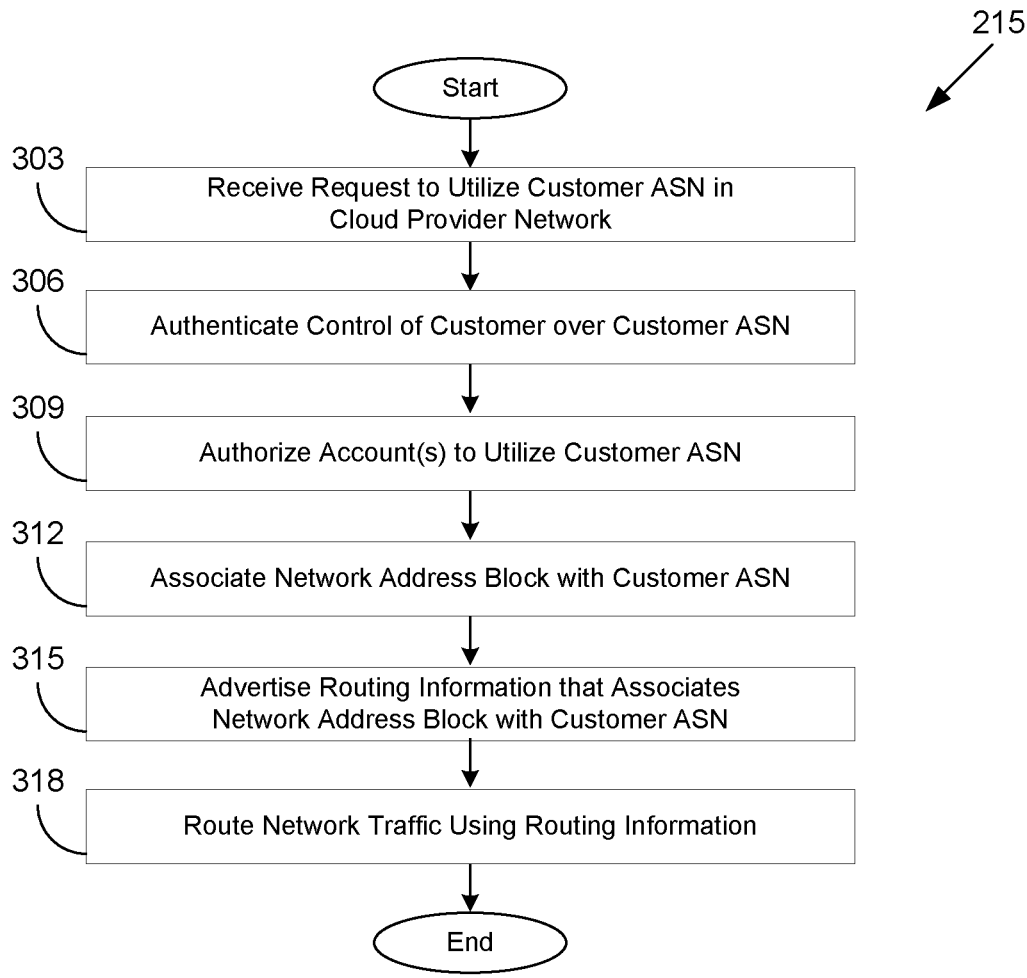

215

Start

303 — Receive Request to Utilize Customer ASN in Cloud Provider Network

306 — Authenticate Control of Customer over Customer ASN

309 — Authorize Account(s) to Utilize Customer ASN

312 — Associate Network Address Block with Customer ASN

315 — Advertise Routing Information that Associates Network Address Block with Customer ASN 318 — Route Network Traffic Using Routing Information End

FIG. 3

SELF-SERVICE MANAGEMENT OF CUSTOMER-OWNED AUTONOMOUS SYSTEM NUMBERS IN A CLOUD PROVIDER NETWORK

BACKGROUND

In modern computer networking, the Internet and other large-scale networks are composed of interconnected routers and switches that direct data packets from their source to their destination. These networks rely on routing protocols to determine the most efficient paths for data packets to traverse through multiple intermediary devices. One widely used routing protocol is the Border Gateway Protocol (BGP), which is used for the inter-domain routing and connectivity of different Autonomous Systems (AS) that make up the Internet.

Autonomous systems are discrete network domains that are independently operated, either by Internet Service Providers (ISPs), enterprises, or other organizations. Each AS is assigned a unique identifier known as an Autonomous System Number (ASN). ASNs are a component of the BGP routing process as they help establish reachability information between different autonomous systems. When routers within autonomous systems communicate with routers in other autonomous systems, they use BGP to exchange routing information, and this process is facilitated by ASNs.

ASNs are managed by a plurality of Regional Internet Registries (RIRs) following policies defined by the Internet Assigned Numbers Authority (IANA). These policies help ensure the uniqueness of ASNs and their efficient utilization. Current ASNs are 32-bit integers and are expressed either directly as an integer or in the "asdot+" form consisting of a first 16-bit integer joined by a period with a second 16-bit integer (e.g., "x.y" where x and y are 16-bit integers). Legacy ASNs, or 16-bit ASNs assigned prior to 2007, are expressed in "asdot+" form with the first integer being zero (e.g., "0.y").

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a flowchart illustrating one example of functionality implemented as portions of an ASN management service executed in a computing environment in the networked environment of FIG. 2 according to various embodiments of the present disclosure.

DETAILED DESCRIPTION

The present disclosure relates to self-service management of customer-owned autonomous system numbers in a cloud provider network. Customers may instantiate a number of computing resources on a cloud provider network. In some cases, the cloud provider network may allow the customer to utilize customer-owned internet protocol (IP) addresses when assigning IP addresses to these resources. While the customer's resources in the cloud provider network may be using the customer's own IP addresses, typically the ASN used for BGP routing of the customer's own IP addresses is an ASN of the cloud provider network.

Usage of the cloud provider network's ASNs in routing the customer's IP addresses can pose problems. ASNs may be associated with a corresponding reputation. While IP address blocks may also be associated with a corresponding reputation, ASN reputation still may be a factor. An ASN's reputation may be affected negatively if the ASN is used, for example, to send unsolicited commercial emails, or spam. Because cloud provider networks are utilized by a multitude of different users, a cloud provider network's ASN reputation may differ from that of its customer's networks. Accordingly, a customer having its own ASN may wish to utilize that ASN for the customer's resources in the cloud provider network in lieu of the cloud provider network's ASN.

Various embodiments of the present disclosure introduce a self-service management system for customers to associate customer-owned ASNs with customer-controlled resources on a cloud provider network. As will be described, an authentication system is used first to confirm that the customer indeed owns the ASN that it wishes to utilize. Second, upon authenticating the customer's ownership or control over the ASN, the customer can then authorize one or more accounts or resources to utilize the ASN. Ultimately, the customer can control and manage the associations between its blocks of network addresses and one or more ASNs.

As one skilled in the art will appreciate in light of this disclosure, certain embodiments may be capable of achieving certain advantages, including some or all of the following: (1) improving the functioning and security of computer networks through the use of customer-owned ASNs for customer-controlled resources, thereby associating customer reputation with the customer-controlled resources; (2) improving the functioning and security of computer networks by introducing approaches to authenticate ASN ownership or control along with authorization of designees to utilize the ASNs; (3) improving the functioning of computer networks by enabling customers of a cloud provider network to manage their ASN associations in a self-service way to meet the needs of their organizations' computer systems; and so forth.

Figure 1A:
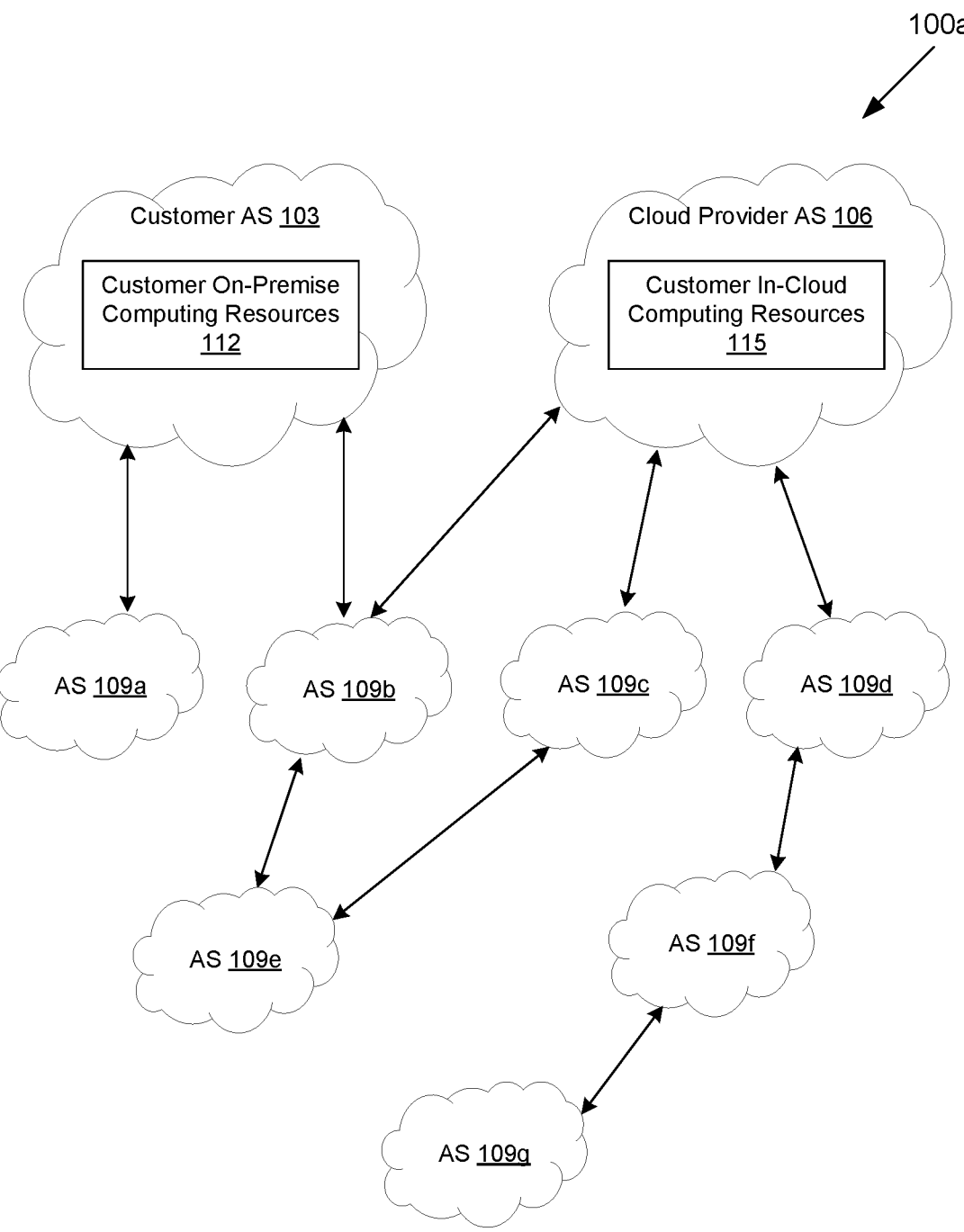
FIGS. 1A and 1B are drawings of example network arrangements according to various embodiments of the present disclosure.

With reference to FIG. 1A, shown is an example network 100a composed of a number of autonomous systems according to one or more embodiments. The example network 100a includes a customer AS 103, a cloud provider AS 106, and a plurality of other ASes 109a-109g. A customer of a cloud provider (e.g., an organization, an enterprise, a non-profit, etc.) may have its own AS and a unique ASN, represented by the customer AS 103. The customer may execute various customer on-premise computing resources 112 in the customer AS 103. In addition, the customer may execute various customer in-cloud computing resources 115 in the cloud provider AS 106.

The ASes 109a-109g represent interconnected autonomous systems such as on the Internet. In this non-limiting example, the customer AS 103 may be interconnected with the ASes 109a and 109b, and the cloud provider AS 106 may be interconnected with the ASes 109b, 109c, and 109d. In turn, these ASes may be interconnected with other ASes, in some cases functioning as a transit provider for other ASes. For example, ASes 109b and 109c may be interconnected with AS 109e, thereby allowing AS 109e to reach the customer AS 103 and the cloud provider AS 106 and vice versa. Likewise, AS 109g may be interconnected by way of a chain from AS 109f to AS 109d.

When any of the ASes 109 route traffic to the customer on-premise computing resources 112, the routing path includes the customer AS 103 as a destination. The customer AS 103 would be the source AS for traffic originating from the customer on-premise computing resources 112. By contrast, when any of the ASes 109 route traffic to the customer in-cloud computing resources 115, the routing path in this example does not include the customer AS 103. Instead, the routing path includes the cloud provider AS 106 as the destination. Likewise, the cloud provider AS 106 would be the source AS for traffic originating from the customer in-cloud computing resources 115. In some cases, customers may find this arrangement problematic in that they may prefer to have their customer in-cloud computing resources 115 associated with their customer AS 103 and its corresponding ASN, similar to the customer on-premise computing resources 112.

Figure 1B:
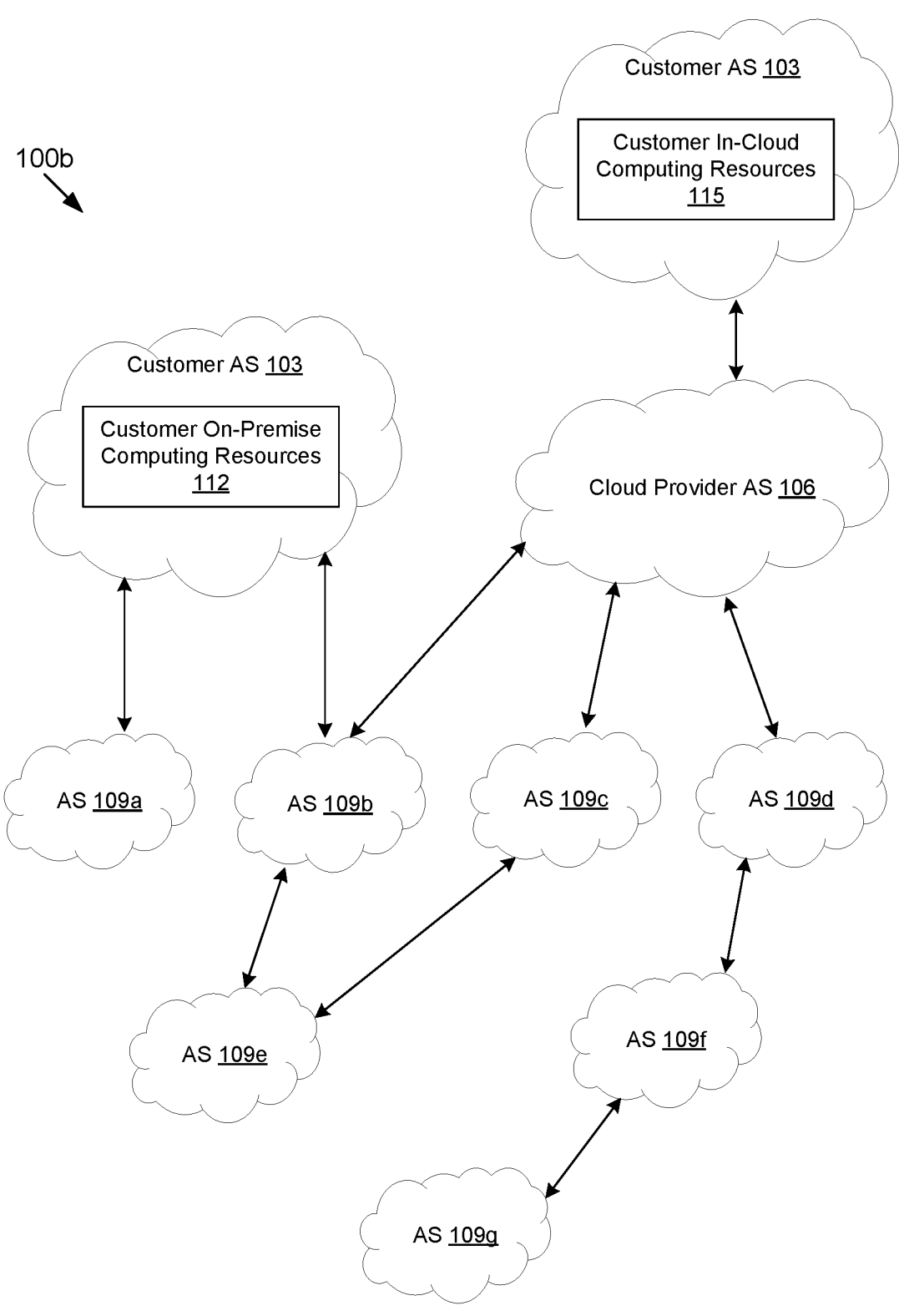

Referring next to FIG. 1B, shown is an example network 100b composed of a number of autonomous systems according to one or more embodiments. Compared to the example network 100a, the customer in-cloud computing resources 115 now appear to be executed in the customer AS 103 rather than the cloud provider AS 106. However, the customer in-cloud computing resources 115 are still executed in the cloud provider network, but the cloud provider network utilizes the customer's ASN when advertising routing information to a block of network addresses corresponding to the customer in-cloud computing resources 115.

In this example, the portion of the customer AS 103 including the customer in-cloud computing resources 115 is advertised as reachable through the cloud provider AS 106. This is as if the cloud provider AS 106 functions as a transit provider AS. However, the cloud provider AS 106 is not truly a transit provider, in that the customer in-cloud computing resources 115 are in fact hosted on the cloud provider's infrastructure. This arrangement allows the customer in-cloud computing resources 115 to be associated with the customer's ASN for reputation purposes in lieu of the cloud provider's ASN. In the following discussion, a general description of the system and its components is provided, followed by a discussion of the operation of the same.

Figure 2:
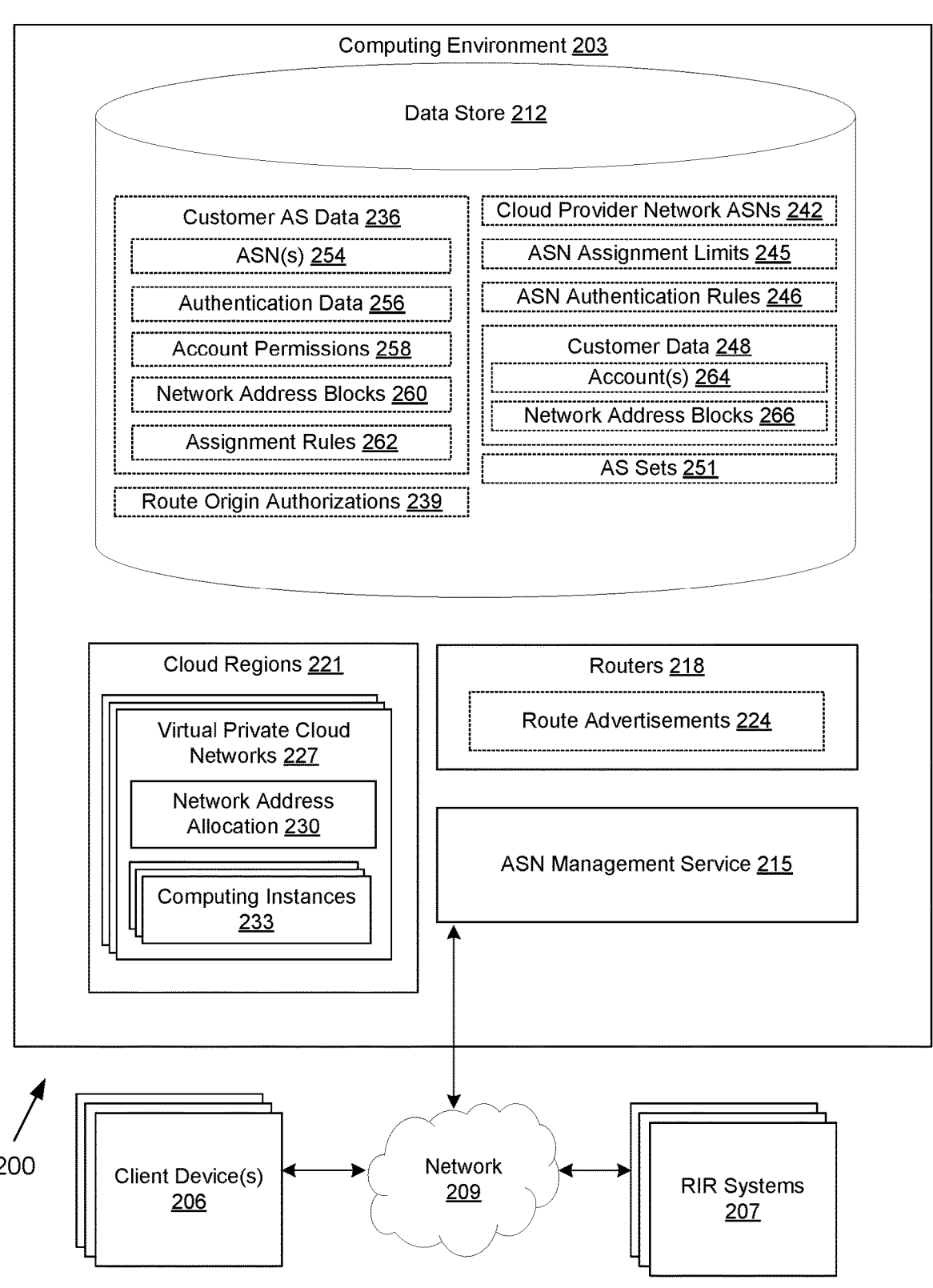
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more client devices 206, and one or more regional internet registry (RIR) system 207, which are in data communication via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

The computing environment 203 may implement a cloud provider network operated by a cloud provider. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network can provide on-demand, scalable computing services to users through a network, for example, allowing users to have at their disposal scalable "virtual computing devices" via their use of the compute servers (which provide compute instances via the usage of one or both of central processing units (CPUs) and graphics processing units (GPUs), optionally with local storage) and block store servers (which provide virtualized persistent block storage for designated compute instances). These virtual computing devices have attributes of a personal computing device including hardware (various types of processors, local memory, random access memory (RAM), hard-disk, and/or solid-state drive (SSD) storage), a choice of operating systems, networking capabilities, and pre-loaded application software. Each virtual computing device may also virtualize its console input and output (e.g., keyboard, display, and mouse). This virtualization allows users to connect to their virtual computing device using a computer application such as a browser, API, software development kit (SDK), or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires.

A cloud provider network can be formed as a number of regions, where each region represents a geographical area in which the cloud provider clusters data centers. Each region can further include multiple (e.g., two or more) availability zones (AZs) connected to one another via a private high-speed network, for example, a fiber communication connection. An AZ may provide an isolated failure domain including one or more data center facilities with separate power, separate networking, and separate cooling from those in another AZ. Preferably, AZs within a region are positioned far enough away from one another such that a same natural disaster (or other failure-inducing event) should not affect or take more than one AZ offline at the same time. Customers can connect to an AZ of the cloud provider network via a publicly accessible network (e.g., the Internet, a cellular communication network).

Transit Centers (TC) are the primary backbone locations linking customers to the cloud provider network and may be co-located at other network provider facilities (e.g., Internet service providers, telecommunications providers). Each region can operate two or more TCs for redundancy.

The parenting of a given edge location to an AZ or region of the cloud provider network can be based on a number of factors. One such parenting factor is data sovereignty. For example, to keep data originating from a communication network in one country within that country, the edge locations deployed within that communication network can be parented to AZs or regions within that country. Another factor is availability of services. For example, some edge locations may have different hardware configurations such as the presence or absence of components such as local non-volatile storage for customer data (e.g., solid state drives), graphics accelerators, etc. Some AZs or regions might lack the services to exploit those additional resources, thus, an edge location could be parented to an AZ or region that supports the use of those resources. Another factor is the latency between the AZ or region and the edge location. While the deployment of edge locations within a communication network has latency benefits, those benefits might be negated by parenting an edge location to a distant AZ or region that introduces significant latency for the edge location to region traffic. Accordingly, edge locations are often parented to nearby (in terms of network latency) AZs or regions.

The cloud provider network can include a physical network (e.g., sheet metal boxes, cables, rack hardware) referred to as the substrate. The substrate can be considered as a network fabric containing the physical hardware that runs the services of the provider network. The substrate may be isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along a substrate network according to constructs in the overlay network (e.g., virtual networks that may be referred to as virtual private clouds (VPCs), port/protocol firewall configurations that may be referred to as security groups). A mapping service (not shown) can coordinate the routing of these network packets. The mapping service can be a regional distributed look up service that maps the combination of overlay internet protocol (IP) and network identifier to substrate IP so that the distributed substrate computing devices can look up where to send packets.

To illustrate, each physical host device (e.g., a compute server, a block store server, an object store server, a control server) can have an IP address in the substrate network. Hardware virtualization technology can enable multiple operating systems to run concurrently on a host computer, for example as virtual machines (VMs) on a compute server. A hypervisor, or virtual machine monitor (VMM), on a host allocates the host's hardware resources amongst various VMs on the host and monitors the execution of the VMs. Each VM may be provided with one or more IP addresses in an overlay network, and the VMM on a host may be aware of the IP addresses of the VMs on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., IP addresses visible to customers) to substrate IP addresses (IP addresses not visible to customers), which can be accessed by various processes on the cloud provider network for routing packets between endpoints.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components of the computing environment 203, for example, include an ASN management service 215, one or more routers 218, one or more cloud regions 221, and other applications, services, processes, systems, engines, or functionality not discussed in detail herein. The ASN management service 215 is executed to facilitate self-service management of ASN usage by customers on a cloud provider network. The ASN management service 215 may provide user interfaces such as a command-line interface and/or a graphical user interface to receive commands and provide responsive information. The ASN management service 215 may also provide application programming interfaces (APIs) to enable other components to interact with the ASN management service 215 programmatically.

The routers 218 are employed to route data traffic between the network 209 and computing resources of the computing environment 203 and between different computing resources of the computing environment 203. The routers 218 may maintain a routing table including one or more route advertisements 224, which associate network addresses with destination or next-hop network interfaces, represented by media access control (MAC) addresses, for example. In some cases, the routers 218 may map overlay network addresses to substrate network addresses in the cloud provider network. The routers 218 may employ routing protocols such as border gateway protocol (BGP), open shortest path first (OSPF), and/or routing information protocol (RIP) to exchange routing information and receive the route advertisements 224. The route advertisements 224 may indicate one or more ASNs associated with the network address blocks.

The cloud provider network may be associated with a plurality of cloud regions 221. In one embodiment, a network address allocation may span only one cloud region 221 in order to simplify routing. In other embodiments, a network address allocation may span multiple regions 221.

Virtual private cloud (VPC) networks 227 of one or more customers may be in a cloud region 221. A VPC network 227 is a custom-defined, virtual network within another network, such as a cloud provider network. A VPC network 227 can provide the foundational network layer for a cloud service, for example a compute cloud or an edge cloud, or for a customer application or workload that runs on the cloud. A VPC network 227 can be defined by at least its address space, internal structure (e.g., the computing resources that comprise the VPC network 227), and transit paths. VPC network 227 resources are typically hosted and provisioned within the cloud provider network, though customer-owned networks may be connected to the VPC network 227 through a gateway. In hosting the VPC network 227, the cloud provide network implements a logical construct using physical, and optionally virtual, resources of the cloud provider network to provision the VPC network 227.

A VPC network 227 is a virtual network dedicated to a particular customer account (or set of related customer accounts, such as different customer accounts belonging to the same business organization). A VPC network 227 is logically isolated from other virtual networks in the cloud. Customers can launch resources, such as compute instances, into a VPC network 227. When creating a VPC network 227, a customer can specify a range of IPv4 and/or IPv6 addresses for the VPC network 227 in the form of a Classless Inter-Domain Routing (CIDR) block. A VPC network 227 can span all of the availability zones in a particular region. After creating a VPC network 227, a customer can add one or more subnets in each availability zone or edge location.

A VPC network 227 may have one or more access controls. Access controls can refer to security groups or network access control lists. Security groups (also known as network security groups, application security groups, cloud security groups, or compute engine firewall rules, in various implementations) act as a virtual firewall for a virtual machine instance to control inbound and outbound traffic. Customers can define security groups as policies that can be applied to specific instances. When a customer launches an instance in a VPC network 227, they can assign one or more security groups to the instance. Security groups may act at the instance level instead of the subnet level. Therefore, each instance in a subnet can be assigned to a different set of security groups. For each security group, the customer can add rules that control the inbound traffic to instances, and a separate set of rules that control the outbound traffic. Security groups can be stateful, in that return traffic is automatically allowed.

A customer can also set up network access control lists (ACLs) with rules similar to security groups in order to add an additional layer of security to a VPC network 227. Network ACLs operate at the subnet level, support allow rules and deny rules, and automatically apply to all instances in any subnet with which it is associated. Network ACLs may not be stateful, in that return traffic must be explicitly allowed by the rules.

Each VPC network 227 may be associated with a network address allocation 230 and one or more computing instances 233. The network address allocation 230 corresponds to a block of network addresses that the customer has assigned to the particular VPC network 227. Different VPC networks 227 may be assigned different size network address allocations 230. Individual network addresses may be assigned to respective computing instances 233 of the customer, so that data traffic to the respective computing instance 233 can be correctly routed using the network address.

Due to the multi-tenant nature of a cloud provider network, a first computing instance 233 on a first customer's VPC network 227 may be executed on the same underlying computing hardware as a second computing instance 233 on a second customer's VPC network 227. Accordingly, two computing instances 233 executed on the same computing hardware may be assigned network addresses associated with different ASNs.

The data stored in the data store 212 includes, for example, customer AS data 236, one or more route origin authorizations (ROAs) 239, one or more cloud provider network ASNs 242, one or more ASN assignment limits 245, one or more ASN authentication rules 246, customer data 248, one or more AS sets 251, and potentially other data.

The customer AS data 236 includes data regarding autonomous systems of customers, which may include both customer on-premise computing resources 112 (FIG. 1B) and customer in-cloud computing resources 115. The customer AS data 236 may include, for example, one or more ASNs 254, authentication data 256, one or more account permissions 258, one or more network address blocks 260, one or more assignment rules 262, and/or other data.

The ASNs 254 correspond to autonomous system numbers that are assigned to, owned by, or otherwise under the control of the customer. In some cases, the ASNs 254 may include ASNs that are owned by or under control of an affiliate of the customer, rather than the customer directly. For example, the customer may act as a reseller or provider of computing services, such as computing services provided by the cloud provider network, to third party affiliates.

The authentication data 256 comprises data used to authenticate the control of customers over given ASNs 254. In one embodiment, a record publicly associated with the ASN 254, such as a comment field, may store cryptographic data (e.g., a secure certificate such as a self-signed X.509 certificate). In another embodiment, the comment field may encode a list of unique account identifiers that are authorized to use the ASN 254. In another embodiment, the comment field may encode a uniform resource locator (URL) of a file that has a listing of entities authorized to use the ASN 254. In these embodiments, the public record associated with the ASN 254 is used to indicate the unique permission of the owner of the ASN 254 to use the ASN 254. The RIR system 207 may provide this public record in response to a query, and the RIR system 207 may allow the customer to update the content of this public record after using an authentication method of the RIR system 207. The authentication data 256 may include a signature or other data element provided by the customer which enables the ASN management service 215 to confirm that the party who generated the signature is the same party who generated the secure certificate. In other implementations, other forms of public key encryption or symmetric key encryption may be used to confirm that the customer has access to modify the public record associated with the ASN 254.

The account permissions 258 indicate one or more accounts of the customer or affiliates of the customer with the cloud provider network that are granted permission to utilize the ASNs 254 in assigning ASNs 254 to network address blocks 260. The account permissions 258 may indicate groups of accounts, organizational roles, and so on, that are to be granted or denied access to use the ASNs 254. In some cases, the account permissions 258 may be associated with an expiry date. In one embodiment, the account permissions 258 are in a file or document listing account identifiers, ASNs 254, and other data, which is then signed using a private key. The signature of this document may then be compared to the secure certificate in the public record associated with the ASN 254 for authentication of control over the ASN 254.

The network address blocks 260 correspond to ranges of network addresses (e.g., internet protocol version 4 (IPv4) or internet protocol version 6 (IPv6) addresses) within a network address pool that are either allocated or are free for future allocations by the customer. In one embodiment, a particular network address block 260 may be allocated to a VPC network 227, and then the network addresses of the network address block 260 may be assigned to individual hosts or computing instances 233 of the VPC network 227. The network address blocks 260 may be associated with an ASN 254 of the customer or a cloud provider network ASN 242. In some cases, the network address blocks 260 may be owned by the customer, while in other cases, the network address blocks 260 may be owned by the cloud provider and assigned for the customer's use.

The assignment rules 262 programmatically control the assignment of, or association between, ASNs 254 and network address blocks 260. The assignment rules 262 may be configured by the customer or an affiliate of the customer. The assignment rules 262 may specify conditions that will result in the assignment of a particular ASN 254 to a particular network address block 260, the reassignment of a different ASN 254 to the particular network address block 260, a restoration of an assignment of a cloud provider network ASN 242 to the particular network address block 260 in lieu of the customer's ASN 254, and so on. The assignment rules 262 may indicate that ASN assignments are done programmatically and with respect to groups or types of computing resources hosted in the cloud provider network. In some cases, the assignment rules 262 may rotate associations among multiple ASNs 254 periodically.

The route origin authorizations (ROAs) 239 are cryptographically signed objects that state which autonomous system is authorized to originate particular network address blocks 260. ROAs 239 may include an origin ASN 254, a network prefix and maximum length, a name, and/or other data. ROAs 239 may be created via the RIR systems 207. A ROA 239 may have an expiration, and upon expiration, the cloud provider network may no longer be authorized to advertise the route. Where the network address blocks 260 are owned by the cloud provider network, the cloud provider network may be responsible for updating the ROA 239 for the network address blocks 260. By contrast, where the network address blocks 260 are owned by the customer, the customer may be responsible for updating the ROA 239 for the network address blocks 260. In some cases, the owner of the network address block 260 may delegate authority to another entity (e.g., the cloud provider) to create the ROA 239.

The cloud provider network ASNs 242 are ASNs used by the cloud provider network. In some cases, a cloud provider network may have multiple ASNs that are used for different scenarios. In some cases, different regions 221 may have different ASNs. Without a customer-configured ASN 254, network address blocks 260 used in the cloud provider network may be associated to a default cloud provider network ASN 242 automatically.

The ASN assignment limits 245 may impose limits on assignment of ASNs 245 to network address blocks 260. In one non-limiting example, the ASN assignment limits 245 may require changes no more frequently than once per hour. The ASN assignment limits 245 may be selected based on risk profiles of customers and generally to increase security. The ASN assignment limits 245 may also be selected to avoid burdens on the backend systems involved in updating records implementing the ASN assignments.

The ASN authentication rules 246 may control how customers are authenticated as having control over an ASN 254. To this end, the ASN authentication rules 246 may control the cryptographic verification of a customer's control over an ASN 254 based on publicly available data associated with the ASN 254, such as a secure certificate.

The customer data 248 includes parameters associated with one or more accounts 264 of a customer of the cloud provider. The parameters may include one or more characteristics that enable assessment of security risk, cloud resource demand, network address allocation demand, demand for VPC networks 227, and/or other information. The customer data 248 may also include information about the network address blocks 266 that are managed by the customer. In some cases, the cloud provider network may provide functionality to manage network address blocks 266, to include importing the customer's own network addresses, splitting network address blocks 266 into smaller network address blocks 266, making new allocations, releasing allocations, and so on.

The AS sets 251 correspond to data objects that group ASNs 254 with similar properties. For example, an AS set 251 may define ASNs 254 that are customers and ASNs 254 that are peers.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices.

The RIR systems 207 correspond to regional internet registries that are charged with managing allocations of network addresses and ASNs in a geographic region. Examples of RIRs include the American Registry for Internet Numbers (ARIN), the African Network Information Center (AFRNIC), the Asia Pacific Network Information Center (APNIC), the Latin America and Caribbean Network Information Center (LACNIC), and the Reseaux IP Européens Network Coordination Center (RIPE NCC). The RIR systems 207 facilitate registration of network addresses; creation, viewing, and removal of ROAs 239; registration and updates of information in the Internet Routing Registry (IRR). The RIR system 207 may use registration data access protocol (RDAP) and/or other protocols for querying information.

Referring next to FIG. 3, shown is a flowchart that provides one example of the operation of a portion of the ASN management service 215 according to various embodiments. It is understood that the flowchart of FIG. 3 provides merely an example of the many different types of functional arrangements that may be employed to implement the operation of the portion of the ASN management service 215 as described herein. As an alternative, the flowchart of FIG. 3 may be viewed as depicting an example of elements of a method implemented in the computing environment 203 (FIG. 2) according to one or more embodiments.

Beginning with box 303, the ASN management service 215 receives a request to utilize a customer ASN 254 (FIG. 2) within a cloud provider network. For example, the customer may submit a request via a web-based interface, command-line interface, or another application programming interface (API). In some cases, the request may specify multiple ASNs 254 to be used. In some scenarios, one or more ASNs 254 may pertain to affiliates of the customer, where the customer is a reseller or other provider to third parties.

In box 306, the ASN management service 215 authenticates the control of the customer over the customer ASN 254. For example, an authentication may be performed as will be described with respect to the flowchart of FIG. 4. Information that is publicly available from the RIR system 207 (FIG. 2) and associated with the ASN 254 may be used to cryptographically verify that the customer is the authorized party of record.

In box 309, the ASN management service 215 authorizes one or more accounts with the cloud provider network to utilize the customer ASN 254. For example, the accounts may be of the customer or of an affiliate of the customer. In one scenario, the accounts may correspond to different divisions or teams of the customer, which may be responsible for different computing resources administered for the customer in the cloud provider network. In some embodiments, the account permissions 258 may be embodied in a document, which is then signed for use in authentication of control over the ASN 254 as in box 306.

In box 312, the ASN management service 215 associates a network address block 260 with a customer ASN 254. For example, a user may log in under an authorized account to manage the network address block 260. The account may be authorized to utilize the customer ASN 254 under box 309. Accordingly, the user of the account is able to associate network address blocks 260 managed under the account with the customer ASN 254.

In some embodiments, the association of a network address block 260 to a customer ASN 254 may be done periodically, in response to a schedule, or in response to an event. In one embodiment, a ROA 239 (FIG. 2) may be created and/or the existence of a ROA 239 may be verified with the RIR system 207 to determined that the network address block 260 is authorized to use the ASN 254 as an origin AS. The association may be programmatically driven by one or more assignment rules 262 (FIG. 2) configured by the customer. For example, the ASN management service 215 may be configured to rotate among multiple ASNs 254 to limit a blast radius for any negative reputational impacts. In some cases, the ASN management service 215 may be configured to deny an assignment or change to an ASN 254 based at least in part on an ASN assignment limit 245, such as an update frequency limit, being reached. In some scenarios, the ASN management service 215 may be configured to programmatically, based upon one or more ASN selection rules in the assignment rules 262, switch between the customer ASN 254 and the cloud provider network ASN 242 that would otherwise be used, or between a first customer ASN 254 and a second customer ASN.

In box 315, the ASN management service 215 advertises routing information (e.g., BGP route advertisements 224) that associates the network address block 260 with the customer ASN 254. The network address block 260 may be used to assign network addresses to computing instances 233 of the customer that are hosted in the cloud provider network. Accordingly, customer in-cloud computing resources 115 (FIG. 1B) assigned a network address from the network address block 260 may thus be associated with the customer ASN 254 in lieu of the cloud provider network ASNs 242. In some cases, the cloud provider network ASNs 252 may be listed as a transit provider for the customer ASN 254, even though the cloud provider is not in fact a transit provider and the computing resources are executed in the cloud provider network. Additionally, one or more AS sets 251 (FIG. 2) may be updated to include the customer ASN 254. These updates may be sent to a routing assets database (RADB). Also, subsequently a customer may elect to deprovision an ASN 254, thus removing its ability to be used in the cloud provider network.

In box 318, the ASN management service 215 may cause, using the advertised routing information, network traffic associated with the network address block 260 to be routed to the customer ASN 254. Thereafter, the operation of the portion of the ASN management service 215 ends.

Figure 4:
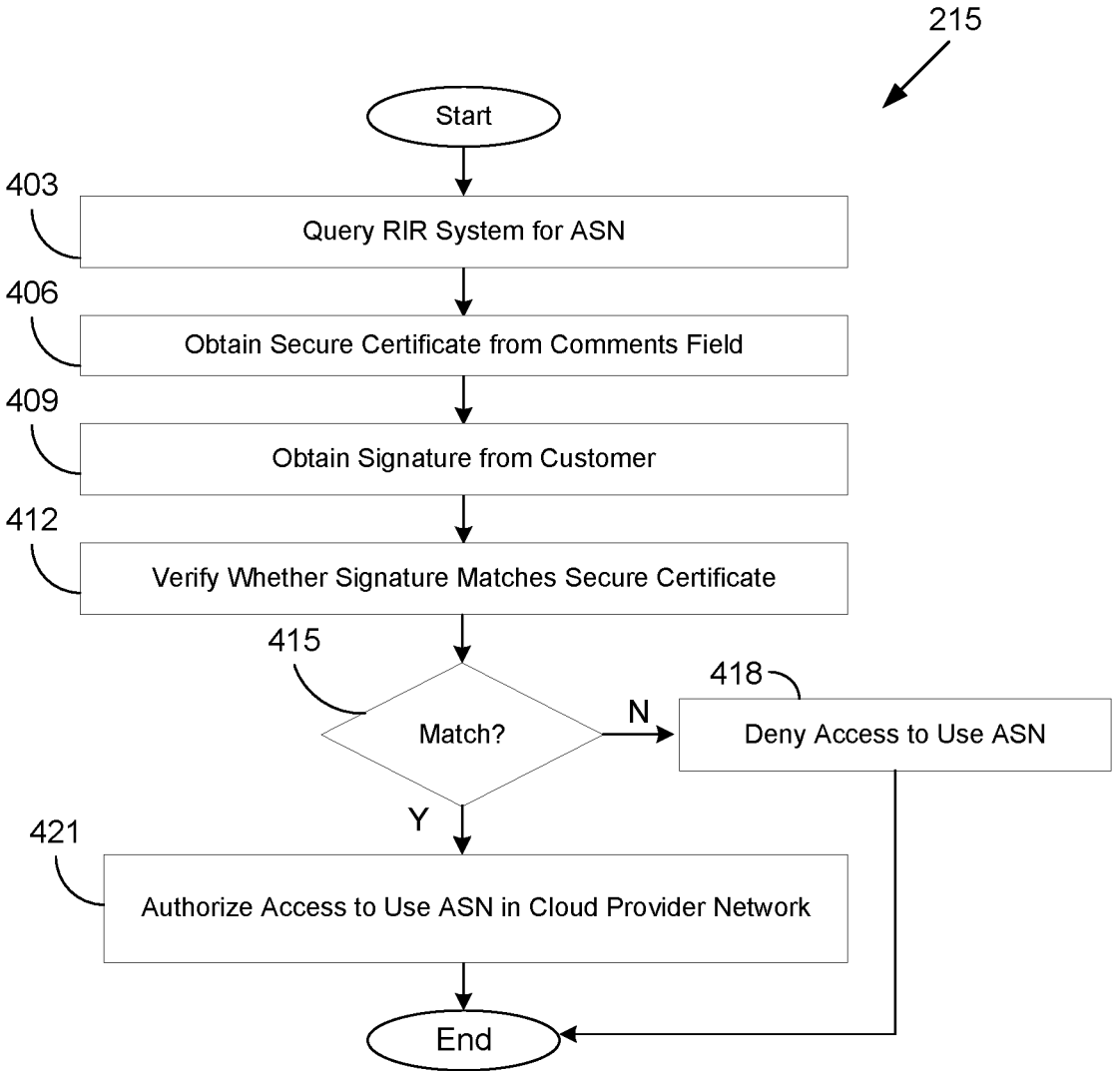
FIG. 4 is a flowchart illustrating one example of functionality implemented as portions of an ASN management service executed in a computing environment in the networked environment of FIG. 2 according to various embodiments of the present disclosure.

Referring next to FIG. 4, shown is a flowchart that provides one example of the operation of another portion of the ASN management service 215 according to various embodiments. It is understood that the flowchart of FIG. 4 provides merely an example of the many different types of functional arrangements that may be employed to implement the operation of the portion of the ASN management service 215 as described herein. As an alternative, the flowchart of FIG. 4 may be viewed as depicting an example of elements of a method implemented in the computing environment 203 (FIG. 2) according to one or more embodiments.

Beginning with box 403, the ASN management service 215 queries an RIR system 207 (FIG. 2) for information about an ASN 254 (FIG. 2). For example, the ASN management service 215 may make a whois API call with the ASN 254 as a parameter. In box 406, the ASN management service 215 obtains a secure certificate or other cryptographic data from a field in the public record retrieved from the RIR system 207. For example, the secure certificate may be a self-signed X.209 certificate retrieved from a comment field or another field.

In box 409, the ASN management service 215 obtains signature data from the customer via an API, web-based interface, or command-line interface. The signature data may be generated by a private key known only to the customer. In one example, the signature data is a cryptographic signature of data corresponding to account permissions 258. In box 412, the ASN management service 215 determines whether the signature matches the public secure certificate in the ASN 254 record (i.e., that the signature was generated by the corresponding private key). If a match is not found in box 415, the ASN management service 215 moves to box 418, and denies access to use the ASN 254 due to a failure of authentication. Thereafter, the operation of the portion of the ASN management service 215 ends.

If a match is found in box 415, the ASN management service 215 instead continues to box 421 and authorizes the customer to have access to use the ASN 254 in the cloud provider network, including the ability for the customer to authorize accounts to associate the ASN 254 with particular network address blocks 260. Thereafter, the operation of the portion of the ASN management service 215 ends.

Figure 5:
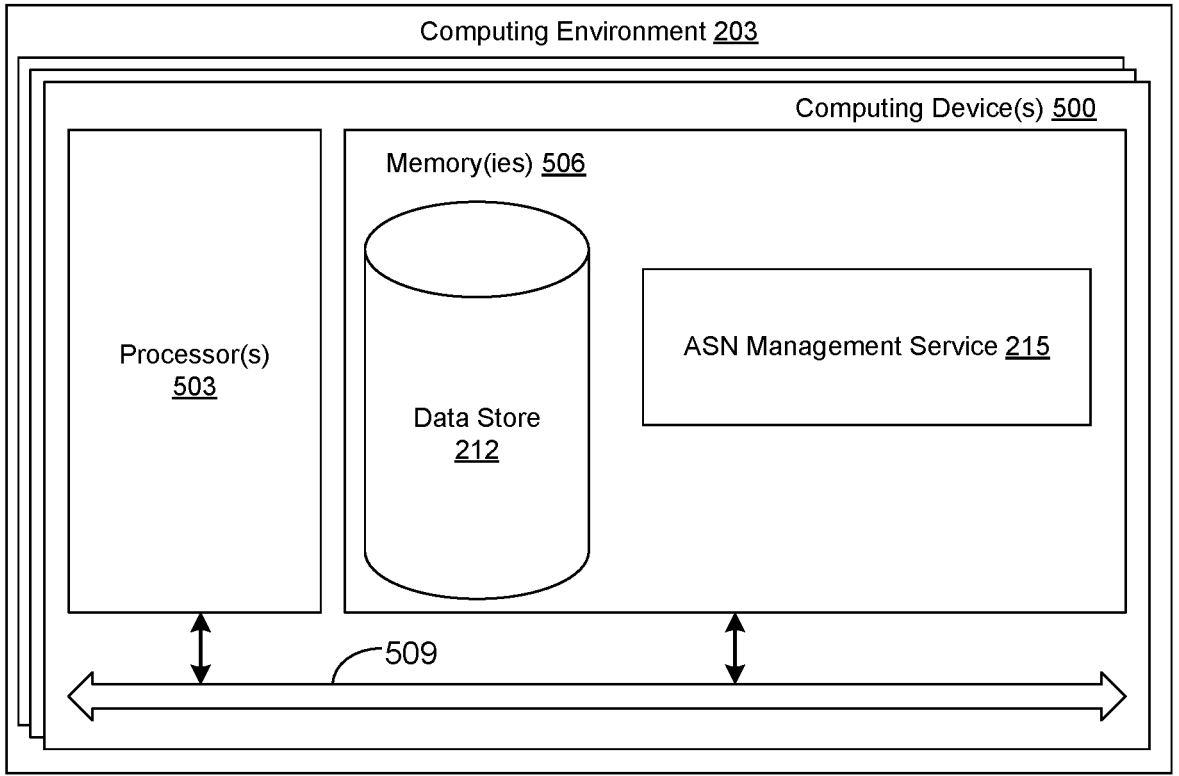
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the ASN management service 215, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PUP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, universal serial bus (USB) flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although ASN management service 215 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the ASN management service 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the ASN management service 215, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the ASN management service 215, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same computing environment 203.

Unless otherwise explicitly stated, articles such as "a" or "an", and the term "set", should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a cloud provider network hosting a computing resource of a customer at a network address in a network address block of the customer; and
at least one computing device configured to at least:
receive a request from the customer to utilize a first autonomous system number (ASN) of the customer in the cloud provider network;
authenticate control of the customer over the first ASN based at least in part on verifying that signature data provided by the customer matches a secure certificate publicly associated with the first ASN; and
cause network traffic to be routed according to routing information that associates the network address block with the first ASN of the customer instead of a second ASN of the cloud provider network.

2. The system of claim 1, wherein the at least one computing device is further configured to at least authorize an account with the cloud provider network to utilize the first ASN based at least in part on an authorization request from the customer, and the network address block is associated with the account.

3. The system of claim 1, wherein the at least one computing device is further configured to at least verify that a route origin authorization configured with a regional internet registry authorizes the network address block to use the first ASN as an origin autonomous system.

4. The system of claim 1, wherein the at least one computing device is further configured to at least programmatically switch an ASN association with the network address block between the first ASN and at least one of: the second ASN or a third ASN based at least in part on one or more ASN selection rules configured for the customer.

5. The system of claim 1, wherein the at least one computing device is further configured to at least:
receive a request from the customer to utilize a third ASN of the customer in the cloud provider network;
authenticate control of the customer over the third ASN based at least in part on verifying that other signature data provided by the customer matches a secure certificate publicly associated with the third ASN; and
advertise routing information that associates another network address block of the customer with the third ASN of the customer instead of the second ASN of the cloud provider network.

6. The system of claim 1, wherein the routing information indicates that the second ASN is a transit provider for the first ASN.

7. A computer-implemented method, comprising:
receiving a request from a customer to utilize a first autonomous system number (ASN) of the customer in a cloud provider network;
authenticating control of the customer over the first ASN based at least in part on data publicly associated with the first ASN;
authorizing an account with the cloud provider network to utilize the first ASN based at least in part on an authorization request from the customer; and causing network traffic to be routed according to routing information that associates a network address block of the account in the cloud provider network with the first ASN of the customer instead of a second ASN of the cloud provider network.

8. The computer-implemented method of claim 7, further comprising updating the routing information to associate the network address block with the second ASN instead of the first ASN in response to an update request.

9. The computer-implemented method of claim 7, further comprising updating the routing information to associate the network address block with a third ASN of the customer instead of the first ASN in response to an update request.

10. The computer-implemented method of claim 7, further comprising denying an update request from the customer to associate the network address block with a different ASN based at least in part on an update frequency limit.

11. The computer-implemented method of claim 7, further comprising receiving a request from the account to associate the network address block with the first ASN.

12. The computer-implemented method of claim 7, further comprising assigning a network address from the network address block to a computing resource in the cloud provider network.

13. The computer-implemented method of claim 7, further comprising creating a route origin authorization with a regional internet registry to authorize the network address block to use the first ASN as an origin autonomous system.

14. The computer-implemented method of claim 7, wherein authorizing the account with the cloud provider network to utilize the first ASN further comprises authorizing a plurality of accounts with the cloud provider network to utilize the first ASN.

15. The computer-implemented method of claim 7, wherein authenticating control of the customer over the first ASN based at least in part on the cryptographic data publicly associated with the first ASN further comprises:

receiving a record for the first ASN by querying a regional internet registry;

receiving a secure certificate from a comments field of the record; and verifying that a signature of account permission data matches the secure certificate.

16. The computer-implemented method of claim 7, further comprising verifying that a route origin authorization configured with a regional internet registry authorizes the network address block to use the first ASN as an origin autonomous system.

17. A computer-implemented method, comprising:

receiving a request from a customer of a cloud provider network to utilize a first autonomous system number (ASN) of an affiliate of the customer in a cloud provider network;

authenticating control of the affiliate of the customer over the first ASN based at least in part on data publicly associated with the first ASN; and causing network traffic to be routed according to routing information that associates a network address block of the affiliate of the customer in the cloud provider network with the first ASN, wherein a second ASN of the cloud provider network is indicated as a transit provider for the first ASN.

18. The computer-implemented method of claim 17, further comprising indicating in the routing information that a third ASN of the customer is a transit provider for the first ASN, wherein the second ASN is indicated as a transit provider for the third ASN.

19. The computer-implemented method of claim 17, wherein authenticating control of the affiliate of the customer over the first ASN based at least in part on the cryptographic data publicly associated with the first ASN further comprises:

receiving a record for the first ASN by querying a regional internet registry;

receiving a secure certificate from a comments field of the record; and verifying that a signature matches the secure certificate.

20. The computer-implemented method of claim 17, further comprising adding the first ASN to an as-set object of the cloud provider network that includes the second ASN.

* * * * *